No. 722,737. PATENTED MAR. 17, 1903.
A. H. MEECH.
SAFETY DEVICE FOR ELEVATORS.
APPLICATION FILED JULY 24, 1901.
NO MODEL. 4 SHEETS—SHEET 2.

Witnesses
Inventor
Alfred H. Meech
By James L. Norris
Atty.

No. 722,737. PATENTED MAR. 17, 1903.
A. H. MEECH.
SAFETY DEVICE FOR ELEVATORS.
APPLICATION FILED JULY 24, 1901.
NO MODEL. 4 SHEETS—SHEET 3.
Fig. 3.
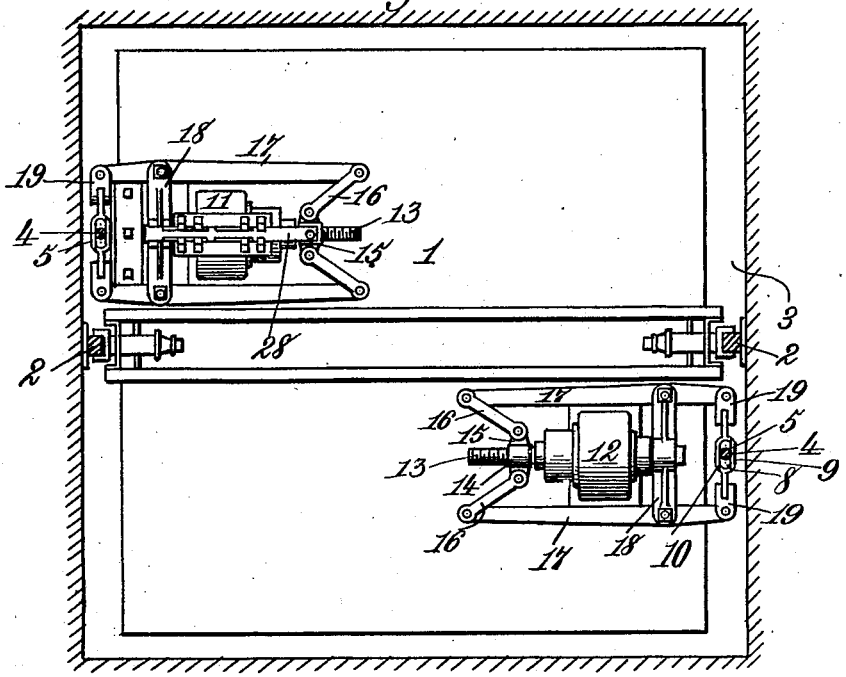
Fig. 4.
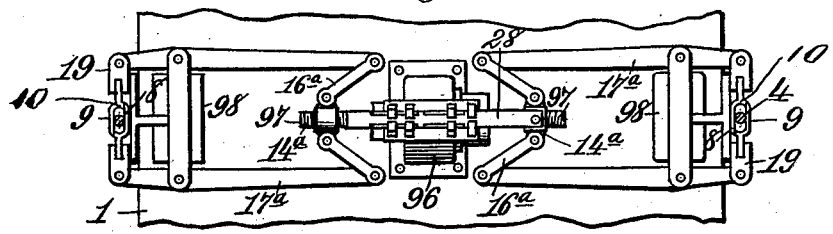
Fig. 5. Fig. 7.
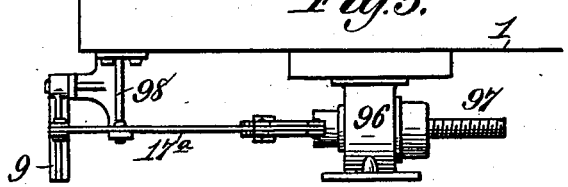 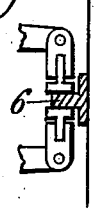
Fig. 6.
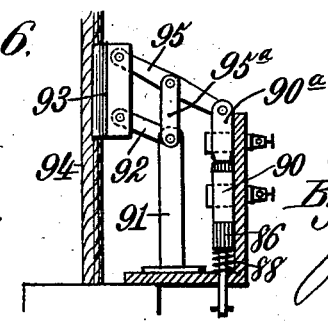
Witnesses. Inventor.
Alfred H. Meech,
By James L. Norris.
Atty.

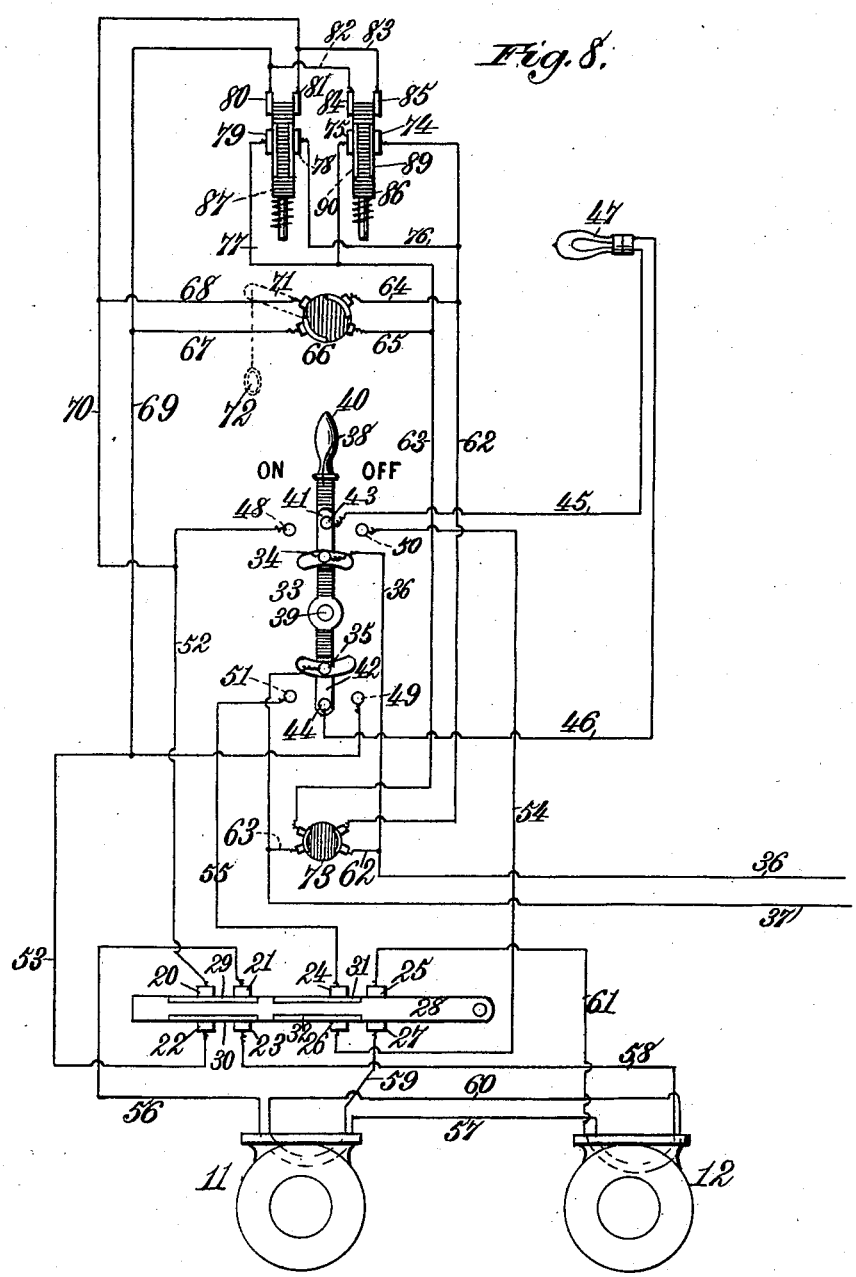

UNITED STATES PATENT OFFICE.

ALFRED H. MEECH, OF CHATHAM, NEW YORK.

SAFETY DEVICE FOR ELEVATORS.

SPECIFICATION forming part of Letters Patent No. 722,737, dated March 17, 1903.

Application filed July 24, 1901. Serial No. 69,596. (No model.)

*To all whom it may concern:*

Be it known that I, ALFRED H. MEECH, a citizen of the United States, residing at Chatham, in the county of Columbia and State of New York, have invented new and useful Improvements in Safety Devices for Elevators, of which the following is a specification.

In an application for patent filed by me of even date herewith, Serial No. 69,595, I have shown and described certain improvements in safety devices for elevators in which a brake is employed adapted to be operated by compressed air independent of the propelling means for the elevator, the connections between the compressed-air reservoir and the brake being constructed and arranged to be thrown into operation to apply the brake automatically by the operation of a valve on the part of the attendant or by the operation of a valve by a passenger or occupant of the car.

My present invention has the same object in view as that set forth in the former application referred to; but instead of employing compressed air for operating the brake it contemplates the use of an electric motor for this purpose, the said motor being adapted to be thrown into operation automatically by the actuation of a switch on the part of the car attendant or by the actuation of a switch on the part of a passenger or occupant of the car.

The details of the invention will hereinafter appear, and the novel features thereof will be set forth in the claims.

Figure 1:
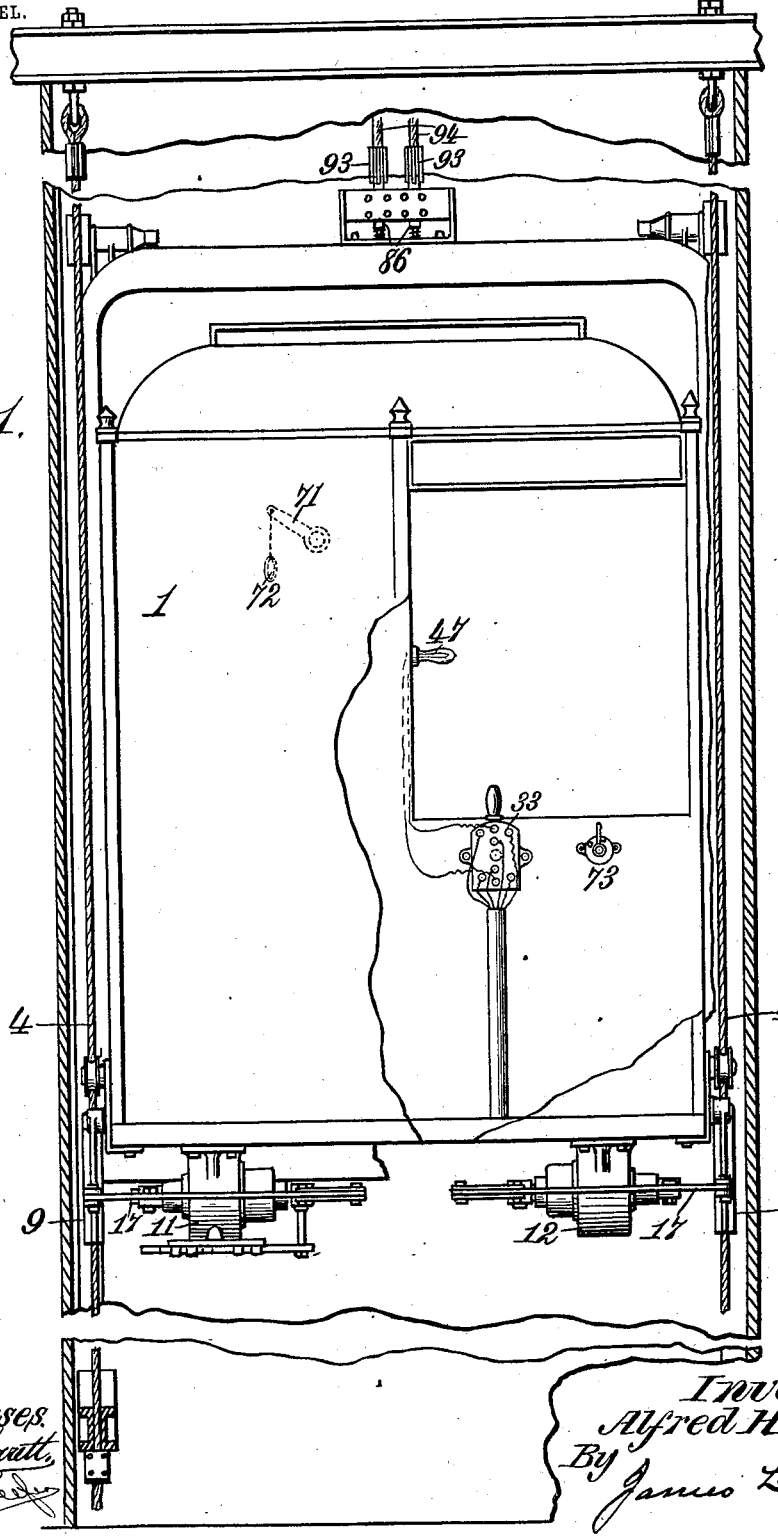
Figure 2:
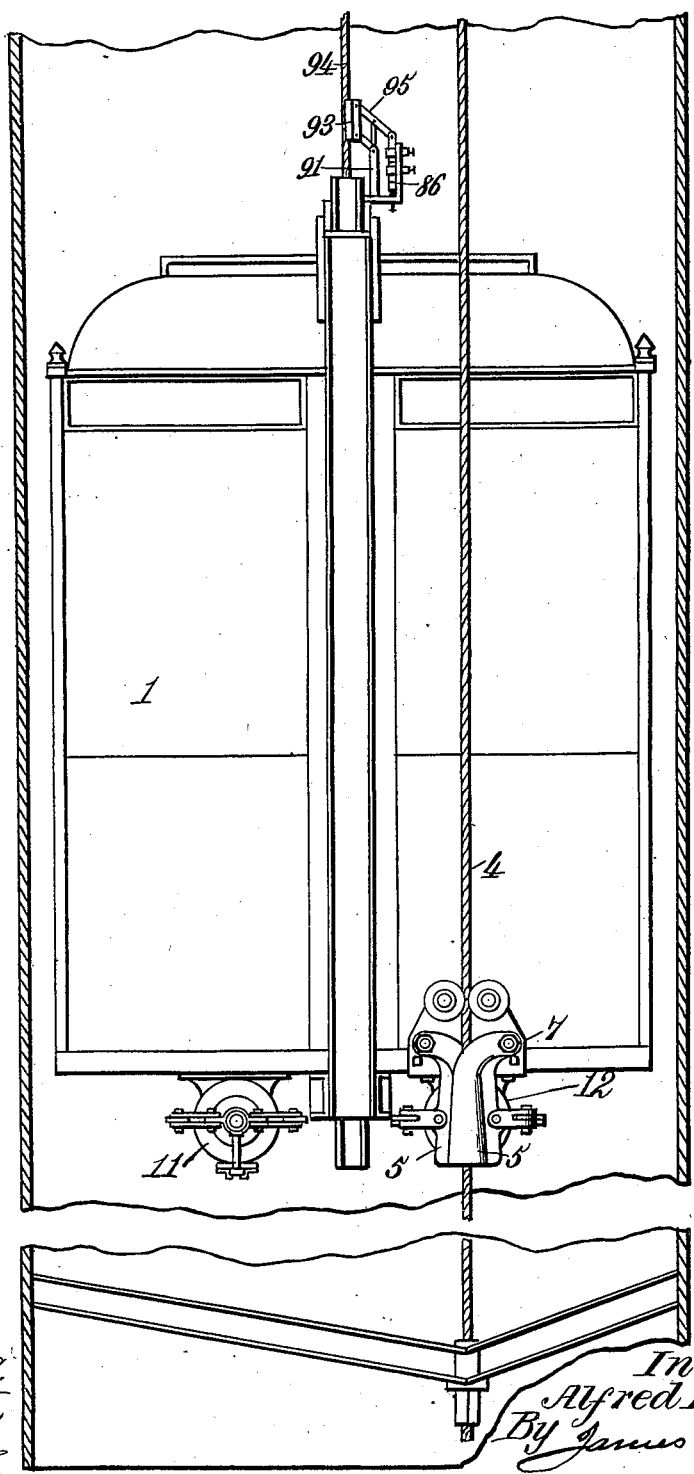

In the drawings forming part of this specification, Figure 1 is a sectional elevation illustrative of my invention. Fig. 2 is a similar view taken at right angles to Fig. 1. Fig. 3 is a bottom plan view of the car. Fig. 4 is a similar view showing a modified construction. Fig. 5 is a side elevation of the same with the connections between the motor and the brake-actuating levers on one side thereof removed. Fig. 6 is a sectional elevation of the automatic circuit-closing device. Fig. 7 is a detail view showing the brake-shoes in gripping engagement with the rail, and Fig. 8 is a diagrammatic view of the circuit connections to the motor.

Like reference-numerals indicate like parts in the different views.

The car 1 may be of any suitable construction, the same being mounted to slide on the guide-rails 2 in the shaft 3. Secured in the shaft 3, on opposite sides thereof and parallel to the guide-rails 2, are the cables 4, with which the brake-shoes 5, mounted on the car, are adapted to coöperate. In lieu of the cables 4 I may employ a T-rail 6, extending from one end of the shaft to the other, as shown in Fig. 7, or any other equivalent stationary part may be substituted for said cables. The brake-shoes 5 are pivotally supported at their upper ends upon the brackets 7 and are normally held out of contact with the cables 4, so that no rubbing or abrading and consequent wear of these parts is brought about in the ordinary use of the elevator. The brake-shoes 5 have the surfaces thereof which lie adjacent to the cables 4 concaved, as shown at 8, forming side flanges 9 10 on each shoe. The flanges 9 are longer than the flanges 10, and the flange 9 on one member of each pair of said shoes overlaps the flange 10 on the other member of said pair of shoes. By this construction a close and effective gripping action between the shoes 5 and the cables 4 may be produced.

Secured to the under side of the car 1 and mounted horizontally are two electric motors 11 12, designed, respectively, for the operation of the brake-shoes 5 on opposite sides of the car. The armature-shaft 13 of each of said motors is screw-threaded and has mounted thereon an internally-screw-threaded collar 14, provided with lugs or ears 15, to which are pivoted the arms 16. The outer ends of the arms 16 are pivoted to the brake-actuating levers 17, fulcrumed upon a bracket 18, secured to the casing of the motor and having pivoted to their free ends the links 19, which are themselves pivotally connected to the brake-shoes 5. By this construction it will be observed that when the motors 11 12 are thrown into operation the armature-shaft 13 of each is rotated, and through the screw-threaded connection between said shaft and the sleeve 14 the latter is forced outwardly or inwardly, according to the direction of rotation of said shaft. When said collar 14 is moved outwardly, the long arms of the brake-actuating levers 17 are spread apart or expanded, and the short arms thereof are forced together or contracted, carrying with them the brake-shoes 5 and forcing the latter into close gripping engagement with the cables 4 or rails 6, according to which form of coöperating device for the brakes is employed.

The motors 11 and 12 are coupled up in series with each other, so that both of the same are simultaneously thrown into and out of operation. The motor 11 has secured to it the contacts 20 and 21, 22 and 23, 24 and 25, and 26 and 27, the said contacts being arranged in pairs, as shown, and the adjacent pairs being located directly opposite each other. Slidingly mounted between the different pairs of said contacts is a contact-bar 28, the same being constructed of wood, rubber, or other insulating material and having mounted thereon the conducting-strips 29 30 31 32, the strips 29 and 30 being adapted to bridge the spaces between the contacts 20 21 and 22 23, respectively, and the strips 31 and 32 being adapted to bridge the spaces between the contacts 24 25 and 26 27, respectively. The contact-bar 28 is connected with the collar 14 on the armature-shaft 13, so that when said collar is moved outwardly or inwardly, due to the rotation of the shaft 13, said bar 28 will be carried with it. Now the normal position of the collar 14 and the contact-bar 28 when the brake-shoes 5 are off is as shown in the drawings—that is, the collar 14 is located at its innermost position adjacent to the casing of the motor 11 and the contact-bar 28 is so disposed that the conducting-strip 29 thereon bridges the space between the contacts 20 and 21 and the conducting-strip 30 bridges the space between the contacts 22 and 23. When in this position, the conducting-strips 31 and 32 are in engagement with the contacts 24 and 26, respectively, but are out of engagement with the contacts 25 and 27, respectively. When the brakes 5 are applied, the collar 14 stands at a position adjacent to the outer end of the shaft 13 of the motor, and the contact-bar 28, which is connected to the collar 14, is moved to its outermost position. When in this latter position, the conducting-strips 29 and 30 are out of engagement with the contacts 20 and 22, respectively, whereas the conducting-strips 31 and 32 are in engagement with the contacts 24 and 25 and 26 and 27, respectively.

For controlling the circuits through the motors 11 and 12 I employ a switch or circuit controller 33, mounted in the car 1 within convenient reach of the attendant, the said switch or circuit controller comprising a casing having the contacts 34 35 therein connected, respectively, with the leading-in wire 36 and the leading-out wire 37 and a switch-lever 38, fulcrumed at 39 and having an operating-handle 40 thereon. The wires 36 and 37 lead from the opposite poles of an electric generator or other suitable source of electrical supply, and the contacts 34 and 35 are of elongated shape. The switch-lever 38 is provided on opposite sides of its fulcrum-point 39 with the conducting-strips 41 42, which are insulated from each other, from the switch-casing, and from the handle 40. Above the contact 34 is a contact 43, and below the contact 35 is a contact 44, the same being connected by the wires 45 and 46 with a lamp 47, located at any convenient point in the car 1. When the switch-lever 38 is in its normal position, the conducting portion 41 thereof lies in engagement with the contacts 34 and 43 and the conducting portion 42 thereof lies in engagement with the contacts 35 and 44. The circuit through the lamp 47 from the generator or other source of electrical supply is then closed over the following path: wire 36, contact 34, conducting portion 41 of switch-lever 38, contact 43, wire 45, lamp 47, wire 46, contact 44, conducting portion 42 of switch-lever 38, contact 35, and wire 37. It will thus be seen that the lamp 47 is normally burning, and thereby serves as an indicator to show whether or not the circuit connections from the generator to the switch 33 are intact. The switch or controller 33 is further provided with the contacts 48 and 49, the same being in line with each other on opposite sides of the fulcrum-point 39 of the switch-lever 38 and with the contacts 50 and 51 in line with each other on opposite sides of the fulcrum-point 39 of the switch-lever 38. The contact 48 is connected through the wire 52 with the contact 20 on the motor 11, the contact 49 is connected through the wire 53 with the contact 22 on the motor 11, the contact 50 is connected through the wire 54 with the contact 26 on the motor 11, and the contact 51 is connected through the wire 55 with the contact 24 on the motor 11. From the contact 21 leads a wire 56, which connects with the interior working parts of the motor 11, and leading from said motor 11 to and through the motor 12 is a wire 57. After leaving the motor 12 the wire 57 is connected, through the wire 58, with the contact 23. Leading from the contact 27 is a wire 59, which connects with the interior working parts of the motor 11, and leading from said motor 11 is a wire 60, which leads into and through the motor 12, said wire 60 after passing through said motor 12 being connected through the wire 61 with the contact 25.

As heretofore stated, the switch or controller 33 is designed to be operated by the elevator attendant for the purpose of throwing the motors 11 and 12 into and out of operation. On opposite sides of the handle 40 of the switch-lever 38 are the words "On" and "Off." When it is desired to apply the brakes 5, it is merely necessary for the attendant to operate the switch by turning the handle 40 of the switch-lever to the position marked "On." The conducting portion 41 of the switch-lever 38 will then be in engagement with the contacts 34 and 48, and the conducting portion 42 of the lever 38 will lie in engagement with the contacts 35 and 49. The circuit through the motors 11 and 12 will then be closed over the following path: wire 36, contact 34, conducting portion 41 of switch-lever 38, contact 48, wire 52, contact 20, conducting-strip 29 on contact-bar 28, contact 21, wire 56 through motor 11, wire 57 through motor 12, wire 58, contact 23, conducting-strip 30 on contact-bar 28, contact 22, wire 53, contact 49, conducting portion 42 of switch-lever 38, contact 35, and wire 37. When the circuit just traced is closed in the manner described, the armature-shaft 13 of each motor 11 12 will be rotated, the collar 14 will be moved outwardly, carrying with it the contact-bar 28, and the long arms of the brake-actuating levers 17 will be spread apart or expanded, forcing the short arms thereof inwardly and causing the brake-shoes 5 to be brought into engagement with the stationary part 4 or 6 with which they coöperate. This action is instantaneous, and the brakes are applied with sufficient power to immediately arrest the movement of the car. When the collar 14 has been moved outwardly a sufficient distance to properly apply the brakes, the contact-bar 28, which is carried thereby, will have reached a position in which the conducting-strips 31 and 32 will bridge the spaces between the contacts 24 25 and 26 27, respectively, and the conducting-strips 29 and 30 will have passed beyond the contacts 20 and 22, respectively. The circuit through the motors is thereby automatically broken at the contacts 20 and 22, and the operations of the motors 11 and 12 will instantly cease. This prevents the jamming of the brake-shoes against the rail or cable with which they coöperate with sufficient force to break the same. When the brakes have been applied and it is desired to release the same, the handle 40 of the switch-lever 38 is turned to the position marked "Off," when the conducting part 41 of said switch-lever will lie in engagement with the contacts 34 and 50 and the conducting part 42 of said lever will lie in engagement with the contacts 35 and 51. The circuit through the motors 11 and 12 will then be closed in a reverse direction over the following path: wire 36, contact 34, conducting part 41 of switch-lever 38, contact 50, wire 54, contact 26, conducting-strips 32 of contact-bar 28, contact 27, wire 59 through motor 11, wire 60 through motor 12, wire 61, contact 25, conducting-strip 31 of contact-bar 28, contact 24, wire 55, contact 51, conducting part 42 of switch-lever 38, contact 35, and wire 37. The motors 11 and 12 will in such case be reversed, and each of the armature-shafts 13 thereof acting upon the collar 14 will withdraw said collar and the contact-bar 28, connected therewith, and thereby compress the long arms of the brake-actuating-levers 17, spreading or expanding the short arms thereof and withdrawing the brake-shoes 5 from the stationary part with which they coöperate. As the contact-bar 28 is moved rearwardly by the collar 14 the conducting-strips 31 and 32 thereon will be separated from the contacts 25 and 27, respectively, and the conducting-strips 29 and 30 will be brought into engagement with the contacts 20 and 22, respectively. As a result of this movement of the contact-bar 28 both motors 11 and 12 will be automatically thrown out of operation as soon as the brake-shoes 5 have been sufficiently removed from the stationary part with which they coöperate to bring the same out of rubbing contact therewith.

The mechanism just described is that which is provided by me for operation by the car attendant, and while simple in construction it requires some little education on the part of the attendant to know which way to turn the switch-lever 38 in order to apply the brakes. In order to provide means whereby a passenger or occupant of the car may apply the brakes during the absence or disability of the attendant, I lead off from the wires 36 and 37 at any convenient point the wires 62 and 63, respectively, the same being connected through the wires 64 and 65, respectively, with a normally open switch 66. From the switch 66 lead the wires 67 68, the same being connected with the wires 69 and 70, the wire 69 being connected with the wire 53 and the wire 70 with the wire 52. The lever 71 of the switch 66 has attached to its free end a pull-cord 72, and in case of accident by merely drawing down on the pull-cord 72 the switch 66 will be moved to its circuit-closing position and the wires 64 and 68 and 65 and 67 will be connected one with the other. This will close the circuit through the motors 11 and 12 over the following path: wires 36, 62, and 64, switch 66, wires 68, 70, and 52, contact 20, conducting-strip 29 of contact-bar 28, contact 21, wire 56 through motor 11, wire 57 through motor 12, wire 58, contact 23, conducting-strip 30 of contact-bar 28, contact 22, wires 53, 69, and 67, switch 66, and wires 65, 63, and 37. The motors 11 and 12 will be thereby thrown into operation, with the result that each of the armature-shafts 13 is rotated in such direction as to force the collar 14 thereon outwardly. This action through the means heretofore described forces inwardly the brake-shoes 5 and quickly arrests the movement of the car. It will thus be seen that means are provided, in addition to those intended for use by the car attendant, whereby a passenger or occupant of the car may throw on the brakes by a simple manipulation of the switch 66. Of course as the outward movement of the collar 14 causes a similar movement to be imparted to the contact-bar 28 as soon as the brakes have been properly applied the motors 11 and 12 will be automatically cut out of the circuit, as heretofore described, by reason of the fact that the conducting-strips 29 and 30 on the contact-bar 28 are moved beyond the contacts 20 and 22, respectively. Now it will be observed that after the switch 66 has been moved in the manner just described to close the circuit between the wires 64 and 68 and 65 and 67 it is necessary to provide means for breaking the circuit through the wires 62 and 63 and those connected therewith in order to cause the reversal of the motors 11 and 12 and the withdrawal of the brake-shoes 5 from the stationary part with which they are in contact. To do this, I locate at a convenient point within reach of the car attendant a switch 73, interposed between the two parts of the wires 62 and 63, which switch is normally closed. By turning the switch to its open position the wires 62 and 63 will be broken, and then by moving the operator's switch 33 to the position marked "Off" thereon the circuit will be closed in a reverse direction through the motors 11 and 12 over the path heretofore traced, and the reverse movement of said motors will cause the withdrawal of the brakes from their operative positions.

In addition to the manually-operated means above described for throwing the motors 11 and 12 into operation, and thereby applying the brakes, I have provided automatic means for closing the circuit through the motors, which means is thrown into operation by a breakage of any one or more of the hoisting ropes or cables. The wires 62 and 63 are extended upwardly to a point above the top of the car and terminate in the contacts 74 and 75. They are also connected through the branch wires 76 77 with the contacts 78 79. The wires 69 and 70 are also extended to a point above the top of the car and terminate in the contacts 80 and 81. Said wires are also connected through the branch wires 82 and 83 with the contacts 84 and 85. The contacts 84 and 85 are located in line with the contacts 75 and 74, and the contacts 80 and 81 are in line with the contacts 79 and 78. Coöperating with the contacts 74, 75, 84, and 85 is a contact-block 86, and coöperating with the contacts 78, 79, 80, and 81 is a contact-block 87. Both of these contact-blocks are of the same construction and are operated in a similar manner, so that a description of one only of the same will be sufficient. The block 86 is mounted to slide vertically and has acting upon the under side thereof and tending normally to raise the same a spring 88. Said block is constructed of insulating material and has secured to opposite sides thereof the conducting-strips 89 90, which are normally held out of contact with the contacts 85 and 84, but which are adapted to connect the contacts 74 and 85 and the contacts 75 and 84. Adjacent to each of the contact-blocks 86 and 87 is a standard or upright 91, to which is pivoted a link 92, attached at its free end to a concave presser-plate 93, normally bearing against one of the hoisting-ropes 94. Said presser-plate is also connected, by means of a lever 95, fulcrumed to the link 95ª on the standard 91, to a holding-block 90ª, bearing against the upper end of the contact-block 86. As the hoisting-rope 94 is connected with and supports the car 1, it is under ordinary conditions rigid or incapable of lateral movement. The presser-plate 93 is therefore held in somewhat elevated position against the action of the spring 88 on the contact-block 86, and when in this position the conducting-strips 89 and 90 are out of contact with the contacts 85 and 84. In case any one of the hoisting-ropes breaks the lateral resistance offered thereby is relieved, and the presser-plate 93 will be moved laterally through the action of the spring 88. When this is done, the contact-block 86 is elevated, moving the conducting-strips 89 and 90 thereon into engagement with the contacts 85 and 84 and connecting the wires 62 and 83 and 63 and 82. The circuit is thereby automatically closed through the motors 11 and 12 over the following path: wires 36 and 62, contact 74, conducting-strip 89 of contact-block, contact 85, wires 83, 70, and 52, contact 20, conducting-strip 29 of contact-bar 28, contact 21, wire 56 through motor 11, wire 57 through motor 12, wire 58, contact 23, conducting-strip 30 of contact-bar 28, contact 22, wires 53, 69, and 82, contact 84, conducting-strip 90 of contact-block, contact 75, and wires 63 and 37. The motors 11 and 12 are thereby energized and the brakes applied in the manner heretofore described. Should the contact-block 87 be actuated by a breakage of the hoisting rope or cable which is connected to the presser-plate 93 thereof, the contacts 78 and 81 and 79 and 80 will be connected together and the flow of current from the wires 62 and 63 to the wires 70 and 69 and thence through the motors, as described, will be by way of the wires 76 and 77, which connect the wires 62 and 63 with the contacts 78 and 79, respectively. Of course any number of hoisting-ropes 94 may be employed, and for each of said hoisting-ropes a presser-plate 93 and the parts above described as being connected therewith will be employed, so that if any one or more of said hoisting-ropes breaks it will automatically cause the actuation of the brakes by the motors 11 and 12.

Instead of employing two motors 11 and 12, one for each set of brake-shoes 5, I may utilize the ordinary guide-rails on opposite sides of the shaft on which the car 1 moves or may employ separate rails 4, located directly opposite each other within the shaft 3, and use a single motor 96, whose armature-shaft 97 extends outwardly therefrom in opposite directions and is provided with right and left hand screw-threads. Each end of the shaft 97 has mounted thereon a collar 14ª, connected by the arms 16ª to the brake-actuating levers 17ª, said levers being fulcrumed upon brackets 98 on the under side of the car and being connected in the manner heretofore described to the brake-shoes 5. By this construction it will be seen that when the motor 96 is thrown into operation in one direction the collars 14ª, which are connected to the opposite ends of the armature-shaft thereof, will be drawn inwardly to apply the brakes, and when said motor is operated in the opposite direction said collars 14ª will be forced outwardly to release the brakes.

Having now described my invention, what I claim as new, and desire to secure by Letters Patent, is—

1. In a safety device for elevators, a brake, an electric motor for actuating said brake, and automatic means, capable of operation independent of the movement of the car, for throwing said motor into operation.

2. In a safety device for elevators, a brake, an electric motor for actuating said brake, and automatic and hand-operated means for throwing said motor into operation, said automatic means being capable of operation independent of the movement of the car.

3. In a safety device for elevators, a brake, an electric motor for actuating said brake, a switch for closing the circuit through said motor, and means independent of the movement of the car for automatically actuating said switch.

4. In a safety device for elevators, a brake, an electric motor for actuating said brake, two switches for closing the circuit through said motor, means for operating one of said switches by hand, and means independent of the movement of the car for automatically actuating the other of said switches.

5. In a safety device for elevators, a brake, an electric motor independent of the propelling means for the car, for actuating said brake, a normally open circuit through said motor, carried by the car, a switch for closing said circuit, and means independent of the movement of the car for automatically actuating said switch.

6. In a safety device for elevators, a pivotally-mounted brake, a rotary electric motor independent of the propelling means for the elevator for actuating said brake, and automatic and hand-operated means for throwing said motor into operation.

7. In a safety device for elevators, a brake, an electric motor for actuating said brake, and means actuated by the motor for automatically cutting off the current to said motor and thereby throwing the same out of operation when the brake is applied.

8. In a safety device for elevators, a brake, an electric motor for actuating said brake, and means for automatically throwing said motor out of operation when the brake reaches the limit of its movement in either direction.

9. In a safety device for elevators, a pivotally-mounted brake, a rotary electric motor independent of the propelling means for the elevator for actuating said brake, a hand-operated switch and an automatically-operated switch for throwing said motor into operation, the latter switch being actuated by a breakage of the hoisting-rope, independent of the movement of the car.

10. In a safety device for elevators, a brake, a stationary part with which said brake coöperates, a brake-actuating lever connected with said brake, an electric motor, and a toggle-joint connection between the armature-shaft of said motor and said lever.

11. In a safety device for elevators, a pair of brake-shoes carried by the car, an electric motor also carried by the car, a pair of brake-levers fulcrumed to a stationary part and pivotally connected with said brake-shoes, and a toggle-joint connection between the armature-shaft of said motor and said levers.

12. In a safety device for elevators, a pair of brake-shoes carried by the car, an electric motor also carried by the car having a screw-threaded armature-shaft, a pair of brake-levers fulcrumed to a stationary part and connected with said brake-shoes, a screw-threaded collar on the armature-shaft of said motor, and a toggle-joint connection between said collar and said levers.

13. In a safety device for elevators, a pair of upright, pivotally-suspended brake-shoes carried by the car, a horizontally-disposed electric motor also carried by the car and having a screw-threaded armature-shaft, a pair of pivotally-mounted brake-actuating levers fulcrumed to a stationary part and pivotally connected with said shoes, a screw-threaded collar on the armature-shaft of said motor, and a toggle-joint connection between said collar and said levers.

14. In a safety device for elevators, a pair of upright, pivotally-suspended brake-shoes carried by the car, each of said shoes having a concave bearing-surface forming flanges, one of which is longer than the other, the long flange on one of said shoes overlapping the short flange on the other, a stationary part in the elevator-shaft with which said shoes are adapted to coöperate, a horizontally-disposed electric motor also carried by the car, a pair of brake-actuating levers fulcrumed to a stationary part and connected with said brake-shoes, and a toggle-joint connection between the armature-shaft of said motor and said levers.

15. In a safety device for elevators, a brake carried by the car, an electric motor for actuating said brake also carried by the car, means for closing an electric circuit through said motor, and means automatically thrown into operation by said motor for breaking said circuit.

16. In a safety device for elevators, a brake carried by the car, an electric motor for actuating said brake also carried by the car, means for closing an electric circuit through said motor, and a circuit-closing device operated by said motor for automatically breaking the circuit therethrough when said brake reaches the limit of its movement in either direction.

17. In a safety device for elevators, a pair of brake-shoes carried by the car, an electric motor also carried by the car having a screw-threaded armature-shaft, means for closing an electric circuit through said motor, a pair of brake-actuating levers fulcrumed to a stationary part and connected with said brake-shoes, a screw-threaded collar on the armature-shaft of said motor, a toggle-joint connection between said collar and said levers, and a circuit-breaking device carried by said collar, whereby the circuit through said motor is automatically broken when said brake-shoes reach the limit of their movement in either direction.

18. In a safety device for elevators, a brake carried by the car, an electric motor for actuating said brake also carried by the car, electric contacts, an electric circuit through said motor including said contacts, and a circuit-controlling device operated by said motor for breaking the circuit between said contacts when said brake reaches the limit of its movement in either direction.

19. In a safety device for elevators, a brake carried by the car, an electric motor for actuating said brake also carried by the car, two sets of electric contacts, two electric circuits through said motor including, respectively, said two sets of contacts, and a circuit-controlling device operated by said motor for automatically closing the circuit between one set of said contacts and simultaneously opening the circuit between the other set of contacts.

20. In a safety device for elevators, a brake carried by the car, an electric motor for actuating said brake also carried by the car, and having a screw-threaded armature-shaft, a screw-threaded collar mounted upon said armature-shaft, electric contacts, an electric circuit through said motor including said contacts, and a contact-bar connected with said collar and provided with conducting-strips normally closing the circuit between said contacts but adapted to open said circuit when said bar is moved in one direction or the other by said collar.

21. In a safety device for elevators, a brake carried by the car, an electric motor for actuating said brake also carried by the car, and having a screw-threaded armature-shaft, a screw-threaded collar mounted upon said armature-shaft, two sets of electric contacts, two circuits through said motor including, respectively, said sets of contacts, and a contact-bar connected with said collar and provided with a plurality of conducting-strips, one of said strips normally bridging the circuit between one set of said contacts but adapted to open the circuit between said set of contacts when said contact-bar is moved in one direction or the other, and the other of said strips lying in a position to maintain the circuit between the other set of said contacts normally open but adapted to bridge the circuit between the same when said contact-bar is moved in one direction or the other.

22. In a safety device for elevators, a brake carried by the car, an electric motor independent of the propelling means for the elevator for actuating said brake also carried by the car, an electric circuit through said motor normally broken at two points, a manually-operated switch at one of said points for closing the said circuit, a switch at the other of said points, and means thrown into operation by a breakage of one of the hoisting-ropes for automatically throwing into operation the latter switch and thereby closing the said circuit.

23. In a safety device for elevators, a brake carried by the car, an electric motor for actuating said brake also carried by the car, a normally open electric circuit through said motor, a switch for closing said circuit, and means coöperating with one of the hoisting-ropes and thrown into operation by the breakage of said rope for automatically operating said switch.

24. In a safety device for elevators, a brake carried by the car, an electric motor for actuating said brake also carried by the car, a normally open circuit through said motor, a switch in said circuit comprising a pair of contacts, and a movable circuit-closing part, means engaging one of the hoisting-ropes for normally maintaining said circuit-closing part out of engagement with one of said contacts, and means for shifting said movable part into circuit-closing position when said hoisting-rope breaks.

25. In a safety device for elevators, a brake carried by the car, an electric motor for actuating said brake also carried by the car, a normally open circuit through said motor, a switch in said circuit comprising a pair of contacts, and a movable contact-block having a conducting-strip thereon, a presser-plate bearing against one of the hoisting-ropes, a lever connected to said presser-plate and to said block whereby the conducting-strip on the latter is held normally out of engagement with one of said contacts, and a spring acting upon said contact-block for moving the latter into circuit-closing position when said hoisting-rope breaks.

26. In a safety device for elevators, a plurality of hoisting-ropes for the car, a brake and an electric motor for actuating said brake, both carried by the car, a normally open electric circuit through said motor, a switch in said circuit comprising a plurality of sets of contacts and a plurality of contact-bars, one for each set of said contacts, each of said bars having a conducting-strip thereon, a spring acting upon each of said bars for normally urging the same into circuit-closing position, a lever connected with each of said bars, and a presser-plate connected with each of said levers and bearing, respectively, upon said hoisting-ropes, whereby when any one, or more, of said hoisting-ropes breaks, the contact bar or bars connected therewith will be automatically thrown into circuit-closing position, the circuit through said motor will be closed and said brake applied.

27. In a safety device for elevators, a plurality of pairs of brake-shoes carried by the car, a pair of brake-actuating levers for each pair of said brake-shoes, an electric motor also carried by the car having the armature-shaft thereof extending outwardly in opposite directions, the opposite ends thereof being provided, respectively, with right and left hand screw-threads, a screw-threaded collar upon each end of said shaft, and a toggle-joint connection between each of said collars and the adjacent pair of said levers.

In testimony whereof I have hereunto set my hand in presence of two subscribing witnesses.

ALFRED H. MEECH.

Witnesses:
WM. M. STOCKBRIDGE,
W. H. CLARKE.